Patented June 24, 1930

1,766,590

UNITED STATES PATENT OFFICE

CHARLES BAUER, OF WESTBURY, NEW YORK, ASSIGNOR TO VET PRODUCTS LABORATORY INC., OF WESTBURY, NEW YORK

ART OF PRODUCING LIQUID FOOD AND THE PRODUCTS THEREOF

No Drawing.    Application filed April 17, 1928.   Serial No. 270,809.

This invention relates to improvements in the art of producing liquid food and the product thereof, and has as its essential object the modifying of cow's milk to prevent reduction of natural acids of the gastric juices below that effected by the normal food.

A further object is the production of a food especially adapted for puppies and other young animals of the small variety.

Cow's milk is an accepted foundation food for puppies as it contains the proper proportions and amount of albumin, fat, water, and proteins, but cow's milk contains more lime, phosphorus, and potash than bitch's milk. It follows, therefore, that the tendency of cow's milk is to disturb the natural acid in the puppy's stomach. The present invention contemplates the production of such a modification of cow's milk as to prevent reduction of the natural acids of the gastric juice to any greater extent than does bitch's milk. By thus modifying the cow's milk, the resulting food becomes a perfectly balanced ration for building the body, preventing digestive disturbances, and killing putrefactive bacteria.

In the carrying out of the process, for purposes of illustration, one quart of cow's milk will be referred to as the initial or foundation food. To one quart of cow's milk in a cold condition is added one hundred twenty drops of lactic acid and one heaping tablespoonful of corn sugar.

Care should be exercised in the mixing of the materials stated to prevent the formation of large curds or the leaving of undissolved sugar in suspension. To this end, the lactic acid should be supplied to the milk in even quantities while continuously stirring the milk. The preferable method of supplying the lactic acid to the milk is drop by drop through a medicine dropper, and the quantity should be carefully measured not to exceed or fall below one hundred twenty drops to one quart of milk, and the stirring operation should not cease at any time until the lactic acid has been thoroughly distributed throughout the body of the milk. After the lactic acid has been thus stirred into the milk, a heaping tablespoonful of corn sugar is supplied and preferably delivered to the milk in small quantity, as by being spilled off of the spoon slowly into the milk while the milk is continuously stirred. When this is completed, the modified milk is ready to serve.

The several steps thus stated should be carefully followed, and any departure therefrom will or is liable to give an unbalanced product. When the process has thus been carried out, the resulting product will show substantially the following ingredients:

From 74 to 84% water, from 12 to 14% solids, from 3.05 to 4% fat, from 6.05 to 9.62% sugar (lactose-glucose), from 3.05 to 4% protein, substantially .7% mineral matter, and from .5 to .7% lactic acid.

The caloric value of the thus modified milk is found to be seven hundred fifty-six calories to the quart. The corn sugar is readily assimilated by the blood and creates muscular energies.

When lactic acid is added to cow's milk it unites with the mineral salts forming lactates, and this in turn aids the rennin of the gastric juices in bringing about a splitting up of casein into peptone and easily assimilated products. The minerals initially found in cow's milk are phosphates of calcium, potassium, and magnesium, and also citrates of sodium and potassium plus calcium chloride. The minerals uniting with lactic acid in the milk are calcium, potassium, and magnesium. The action of the lactic acid appears not to effect the fats but causes the proteins to combine with the casein to render it more digestible, and the minerals combine to form soluble lactates. Hence, the modified milk is very easily assimilated by young animals of the small variety with which ordinary cow's milk would not agree.

As evidence of the efficacy of the modified milk, tests have been made thereof with the digestive ferments from the stomach of an animal, and the result invariably has been that the thus modified milk digests in a very much shorter time than ordinary cow's milk. This conclusively indicates that the modified milk is especially fitted for feeding to young animals of the small variety.

Every precaution should be taken in the practicing of the process to avoid contamination by extraneous or foreign substances, and to that end the compounding should be done preferably in a glass or porcelain container and never in a metal receptacle liable to erode or otherwise react from the acid, and after the milk has been modified and ready for service, unless consumed at once, it is necessary only to keep it in a cool place as the treatment acts to suppress bacterial activity. The best conditions are those ordinarily employed with milk, such as the keeping of the same in the customary domestic refrigerator.

What is claimed is:—

1. The process of producing food for young animals of the small variety comprising adding to fresh cow's milk in a cold condition lactic acid in such proportions to the milk as to correspond to a ratio of one hundred twenty drops of lactic acid to one quart of milk, and effecting the addition by dropping the lactic acid in successive drops into the milk while stirring the milk and thoroughly intermixing the acid therewith, and adding corn sugar to the resulting mixture in a quantity sufficient to bear that proportion to the milk which a heaping tablespoonful of corn sugar bears to one quart of milk.

2. Food for young animals of the small variety comprising fresh cow's milk, lactic acid, and corn sugar, the lactic acid and corn sugar being in quantities bearing that ratio to the milk which one hundred twenty drops of lactic acid and one heaping tablespoonful of corn sugar bears to one quart of milk, and the lactic acid having been introduced into the milk in individual drops successively delivered to the milk while the milk was being stirred.

In testimony whereof I affix my signature.

CHARLES BAUER.